(12) United States Patent
Wu (10) Patent No.: US 12,131,563 B2
(45) Date of Patent: Oct. 29, 2024

(54) SYSTEM AND METHOD FOR ZERO-SHOT LEARNING WITH DEEP IMAGE NEURAL NETWORK AND NATURAL LANGUAGE PROCESSING (NLP) FOR OPTICAL CHARACTER RECOGNITION (OCR)

(71) Applicant: Singularity Systems Inc., Princeton, NJ (US)

(72) Inventor: Tianhao Wu, Princeton Junction, NJ (US)

(*) Notice: Subject to any disclaimer, the term of this patent is extended or adjusted under 35 U.S.C. 154(b) by 365 days.

(21) Appl. No.: 17/689,124

(22) Filed: Mar. 8, 2022

(65) Prior Publication Data
US 2022/0284721 A1 Sep. 8, 2022

Related U.S. Application Data (60) Provisional application No. 63/157,988, filed on Mar. 8, 2021.

(51) Int. Cl.
*G06V 30/19* (2022.01)
*G06V 10/82* (2022.01)

(52) U.S. Cl.
CPC ........ *G06V 30/19147* (2022.01); *G06V 10/82* (2022.01); *G06V 30/1908* (2022.01); *G06V 30/19173* (2022.01)

(58) Field of Classification Search
CPC ...................................................... G06V 10/82
See application file for complete search history.

(56) References Cited

U.S. PATENT DOCUMENTS

| | | | |
|---|---|---|---|
| 9,384,389 B1* | 7/2016 | Sankaranarayanan | G06V 30/12 |
| 10,685,286 B1* | 6/2020 | McDonnell | G06N 3/045 |
| 2019/0087952 A1* | 3/2019 | Milbert | G06V 30/424 |
| 2020/0134382 A1* | 4/2020 | Zhuravlev | G06F 18/217 |
| 2020/0257755 A1* | 8/2020 | Staar | G06F 40/169 |
| 2020/0364451 A1* | 11/2020 | Ammar | G06V 10/768 |
| 2020/0410231 A1* | 12/2020 | Chua | G06F 18/2413 |
| 2021/0217215 A1* | 7/2021 | Sousa | G06N 3/045 |
| 2021/0248420 A1* | 8/2021 | Zhong | G06V 10/82 |
| 2021/0286989 A1* | 9/2021 | Zhong | G06F 40/177 |
| 2022/0284721 A1* | 9/2022 | Wu | G06V 30/18057 |

* cited by examiner

*Primary Examiner* — Edward Park
(74) *Attorney, Agent, or Firm* — Zhong Law, LLC (57) ABSTRACT

A system and method for constructing a training dataset and training a neural network include obtaining a searchable portable document format (PDF) document, identifying a bounding box defining a region in a background image that is associated with an overlaying text object defined in the PDF document, determining an image crop of the PDF document according to the bounding box, and generating a training data sample for the training dataset, the training data sample comprising a data pair of the image crop and the associated text object.

14 Claims, 5 Drawing Sheets

SYSTEM AND METHOD FOR ZERO-SHOT LEARNING WITH DEEP IMAGE NEURAL NETWORK AND NATURAL LANGUAGE PROCESSING (NLP) FOR OPTICAL CHARACTER RECOGNITION (OCR)

CROSS-REFERENCE TO RELATED APPLICATIONS

This application claims the benefits of U.S. Provisional Application No. 63/157,988 filed on Mar. 8, 2021, the content of which is incorporated herein in its entirety.

TECHNICAL FIELD

The present disclosure relates to machine learning technologies in the context of document processing, and in particular, to a system and method for zero-shot learning with deep image neural network and natural language processing (NLP) for optical character recognition (OCR) training.

BACKGROUND

Neural networks are widely applied in machine learning tasks including the task of optical character recognition (OCR). The OCR technology may be used to recognize characters (e.g., linguistic, numerical, and mathematical symbols) in document images. Examples of document images may include images of bank checks, receipts, legal documents etc. Commonly, the document images may contain characters of one or more natural languages that are understandable by human readers. Traditionally, the OCR tasks may include the training of an image model (e.g., a first neural network model) that may be used to generate results in the form of recognized characters from a document image containing these characters. The results generated by using the image model may be different from the characters contained in the image, thus including certain recognition errors such as wrong recognitions and miss recognitions. The recognition accuracy may be defined as the percentage of correctly recognized characters over the total characters in the image. To improve the accuracy of the character recognition based on the image model, a natural language model (e.g., a second neural network) may be used to correct or mitigate the recognition errors in the results generated by using the image model. Thus, traditional OCR may include learning an image model using a training dataset in the image domain, where the image model may be used in an application to convert inputs of image pixel values to characters in one or more natural languages. Further, the traditional OCR may include learning a separate natural language model that may be used to correct different types of errors (e.g., misrecognition errors, false recognition errors, spell errors, grammatic errors) in the results generated by applying the image model. The training of the image model and the training of the natural language model require two separate training datasets (one in image domain and one in linguistic domain), and the two neural networks for image model and language model are not trained in a unified manner, thus having no connections between these two neural networks. The image model requires image data while the natural language model requires linguistic data. Each model may require a large amount of training data that need to be labeled.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

It is time-consuming and challenging to create separate but large training datasets for training the image model and the natural language model used in OCR tasks. The separate trainings of two neural networks could produce two separated neural networks that cannot utilize each other's knowledges.

To overcome these identified and other deficiencies in the current OCR technologies, implementations of the disclosure provide a unified neural network for OCR (referred to as the "unified OCR model") that can be a hybrid model combining features of an image-based deep learning neural network and features of a natural language processing model to achieve the learning both the image aspect and natural language aspect of the OCR application in document processing. Instead of requiring separate sets of training datasets, the unified OCR model according to implementations of the disclosure require a single set of training data, thus reducing the needs for large, disparate training datasets and reducing the consumption of computing resources in the training step.

The training dataset for training the unified OCR model is characterized by the combination of image domain features and linguistic domain features. For example, a training data sample may include both an image patch and the characters therein. Implementations of the disclosure further provide a system and method to prepare training dataset for training the unified OCR model or other types of OCR models. The system and method may include obtaining searchable PDF documents from data sources (e.g., by a crawler to retrieve from the Internet or intranet of an organization), identifying bounding boxes that contain background image and a text layer including searchable texts, cropping training samples according to the bounding boxes, and optionally augmenting the background images and the front text of the training samples to create training data. In this way, implementations of the disclosure may efficiently generate a large quantity of high-quality training data without consuming a large amount of manpower in the labeling of training data.

Figure 1:
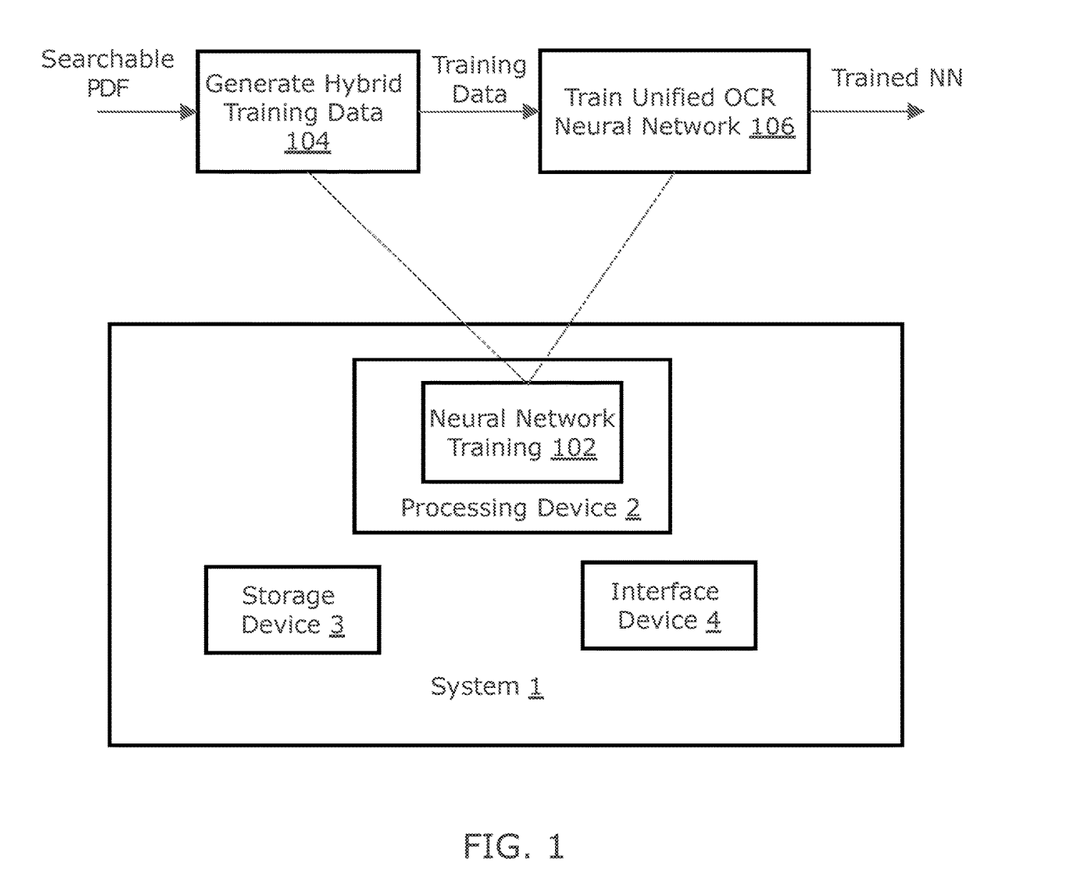
FIG. 1 illustrates a system for generating training data and training a unified OCR model according to an implementation of the disclosure.

FIG. 1 illustrates a system 1 for generating training data and training a unified OCR model according to an implementation of the disclosure. Referring to FIG. 1, system 1 may include a processing device 2, a storage device 3, and a user interface device 4, where the storage device 3 and the user interface device 4 are communicatively coupled to processing device 2.

Processing device 2 can be a hardware processor such as a central processing unit (CPU), a graphic processing unit (GPU), an accelerator circuit, or a cloud computing resource. Storage device 3 may include memory and hard disc that may store executable code that may be executed by processing device 2. User interface device 4 may include a display such as a touch screen of a desktop, laptop, or smart phone. User interface device 4 may further provide a graphical user interface that the user may interact with elements presented on the graphical user interface using an input device such as a mouse or touch screen.

In one implementation, processing device 2 may be configured to execute a neural network training program 102 that, when executed, may perform operations to train a neural network. Neural network training program 102 may, at 104, generate hybrid training data that can be a data sample including both an image segment and the text therein. Neural network training program 102 may, at 106, further train a unified OCR model. The trained OCR model may be used to accurately recognize the texts in document images.

The training data can be used to train the unified OCR model (referred to as the "training dataset"). The unified OCR model may combine the characteristics of an image model and a natural language model into one neural network that is characterized by parameters learned using a hybrid training data. The hybrid training data can be a set of data samples that each may be composed of a data pair of <image crop, the corresponding text present in the image crop>. An image crop can be an array of pixels (e.g., 10×20 pixels) cropped from a document image. The image crop may exhibit certain texts therein. The document image can be a grey level or color image of the document obtained, for example, by scanning Thus, each pixel can be represented by one channel of a certain number of bits (e.g., eight bits) or three channels (e.g., red, green, blue) each including a certain number of bits. The training of a proper OCR model that can be used in real-world applications usually requires hundred million of such training data samples. Traditionally, these training data samples are obtained by human operators (e.g., data specialists) using a certain software tool to manually crop out a portion of image and label the image crop with corresponding text. Because the training of an OCR model may require a large amount of training data, it is very expensive to employ human operators to label such a large amount of data samples manually. To mitigate this problem, in some practice, synthetic training data may be generated according to certain rules to substitute the real image data. Although the synthetic training data can be generated quickly and in theory in unlimited amount, synthetic data are usually generated based on deterministic rules. Thus, the synthetic data may include limited variety and contain bias introduced by the rules. Because of these reasons, the synthetic data when used in training of OCR models may not achieve the same level of accuracy as the real world training data which may include virtually unlimited varieties of document images.

To overcome the deficiencies of the synthetic training data and the lack of real-world hand-labeled training data, implementations of the disclosure provide a method to quickly identify real images with highly-accurate corresponding texts that can be used to train the OCR models. Implementations of the disclosure may generate the real OCR training data from searchable portable document format (PDF) data that are available in public (e.g., those PDF documents that can retrieved on the Internet) or already existing in the internal document storages.

The PDF is a document format that specifies the display of a document in an electronic form on a display device independent from the software, hardware or operating system they are viewed on. A searchable PDF is a PDF file that may define a background image(s) and a floating text layer on top of the background image(s), where the texts in the text layer are searchable based on text inputs. The searchable PDFs that are used in this disclosure are digitally generated PDF documents. A tremendous amount of searchable PDF documents already exist on the Internet because the searchable PDF is the most common file format used to share documents among institutions.

Figure 2:
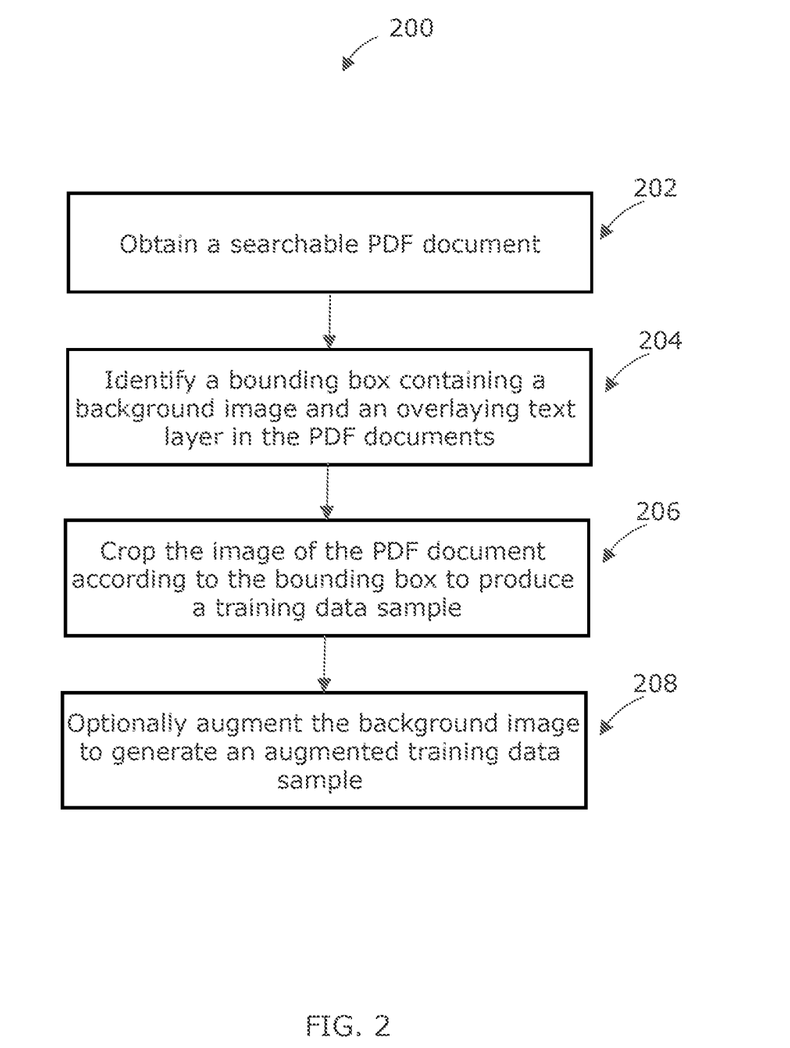
FIG. 2 illustrates a flowchart of a method for generating training data from searchable PDF documents according to an implementation of the disclosure.

Implementations of the disclosure provide a computer-implemented method to efficiently generate a large quantity of training data from searchable PDF documents. FIG. 2 illustrates a flowchart of a method 200 for generating training data from searchable PDF documents according to an implementation of the disclosure. Method 200 includes operations that may be performed by a processing device that may comprise hardware (e.g., circuitry, dedicated logic), computer readable instructions (e.g., run on a general purpose computer system or a dedicated machine), or a combination of both. Method 200 and each of its individual functions, routines, subroutines, or operations may be performed by one or more processors of the computer device executing the method. In certain implementations, method 200 may be performed by a single processing thread. Alternatively, method 200 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be needed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 200 may be performed by a processing device 2 as shown in FIG. 1.

As shown in FIG. 2, processing device 2 may, at 202, obtain a searchable PDF document. The searchable PDF document may have been an internal document stored within an intranet or a document available to the public on the Internet. In some implementations, to obtain the searchable PDF document, processing device 2 may use a web crawler to search the Internet to identify and retrieve the searchable PDF document from the Internet. The searchable PDF document may contain a text layer including symbols of one or more natural languages, numbers, and/or signs that are readable by a human reader. Further, the searchable PDF may include display information as to how to render the document as a background image on a display device (e.g., a screen, a printer). The display information may include positions of text objects, lengths of text objects, fonts of the text etc.

At 204, processing device 2 may identify a bounding box defining a region in a background image and an overlaying text layer according to the searchable PDF document. The searchable PDF document can be rendered as the background image having an array of pixels. The bounding box may define a rectangular region that may cover a portion of the image, where the height and width of the bounding box may be measured in terms of numbers of pixels. In particular, the content of a Portable Document Format (PDF) file may be organized according to document structure descriptors that may include an identifier (e.g., Td or TD) for defining the beginning position of a text object with reference to the dimension of the background image presented on a display device. For example, Td (or TD) may specify the 2D coordinate values of the bounding box with reference to the background image. Further information defined according to the document structure descriptors may include the font information of the text object and a width information of the text object. Font information is defined as font dictionary objects in the PDF document which may include the font types and font sizes. The height of the bounding box may be calculated according to the font information. The width information may define a length of the text object on the background image. Other information that may be used to calculate the bounding box may include different text position shifts such as superscript and/or subscript. The text position shift information may be specified according to a text rise operator (Ts) which may be a factor for determining both the height and width of the text object on the background image. Processing device 2 may calculate the positions of the bounding box and its height and width in the background image of the searchable PDF document based on the beginning position, the font information, the width, and optionally the text position shift information of the text object. A single searchable PDF document may include one or more text objects and therefore, can result in one or more bounding boxes defining one or more training data samples. Each text object may include a word, a sentence, a paragraph, and/or an article composed from one or more natural languages.

At 206, processing device 2 may perform a crop operation on the background image of the searchable PDF document according to the bounding box to produce a potential training data sample. The training data sample may include a data pair including the image crop within the bounding box and the text object in the text layer overlaying on the image. The image crop may include an array of pixel values within the bounding box. The text object can be one or multiple lines of natural language text. In this way, the training data sample may be generated with close to 100% accurate text and the underlying real image rendered based on the searchable PDF document without the need for manual labelling. This approach may achieve the zero shot (i.e., no manual labeling by human operators) learning in the unified OCR model training. Processing device 2 may add the training data sample in a training dataset that may be used for training the unified OCR model.

Implementations of the disclosure may further enhance the training data sample. At 208, processing device 2 may further augment the background image to produce an augmented training data sample. The augmentation may add variations that may happen in practice, thus producing more useful training data samples. Implementations of the disclosure may support two types of augmentations to the crop image and the associated text object. The first type of augmentation may include adding random variations to the pixel values in the background image crop to allow the learning of variations in the image. In the second type, the processing device may perform customization of color schema, random rotation, random blurry, random torsion, random transparency generation to the background image. In one example, to crop two images to the same size to merge these two images, usually a stamp would be always in the center of the line data. Applying the roll operation (available in the NumPy library of Python) enables the stamp image to be stamped more randomly in the crop image. After augmenting, processing device 2 may add the augmented training data sample to the training dataset, thus enrich the training dataset to include variations to the images of searchable PDF documents.

The generated training dataset may be used to train a machine learning model for OCR tasks. In one implementation, the model can be any suitable types of machine learning models including, for example, linear regression, logic regression, decision tree, support vector machine (SVM), Bayesian, gradient boosting machine (e.g., light-GBM), or neural network models. The machine learning models may be initialized with starting parameter values (e.g., default parameter values) that may be iteratively adjusted to optimal parameter values in the model training stage. Properly trained machine learning models may be used to recognize fields and extract values associated with the fields in a recognition stage. The properly trained machine learning models may help achieve a target error rate and recall rate that are collectively referred to as the accuracy in the recognition stage.

In one implementation, a training data sample includes an image crop containing an array of pixel values and a text object that is present in the image crop. In training the machine learning model, the image crop can be the input and the text object can be the target output when applying the machine learning model to the image crop. The machine learning model may include an input layer, one or more calculation layer, and an output layer. The training process may be carried out in a forward propagation and backward propagation iteratively. In the forward propagation, the machine learning model is applied to the input image crop and generate an intermediate output. The intermediate output may be compared with the target output to determine a training error. In the backward propagation, the parameters of the calculation layers may be adjusted in a direction to minimize the training error. The forward and backward propagations may be performed iteratively until the training error is converged to a value that meets certain criteria. The trained machine learning model may then be deployed for OCR tasks such as recognizing characters or symbols contained in document images.

In another implementation, a unified OCR model that is a neural network combining the characteristics of the image model and the natural language model to achieve the learning of the image aspect and natural language aspect of the document image. As discussed above, the training dataset obtained according to the method described in FIG. 2 may include image based features and nature language based features that can be combined into a unified feature vector space. The unified OCR model may be trained utilizing not only the image features characterized by an array of pixel values but also language-specific linguistic features characterized by the text embedded in the array of pixel values, and can be trained to perform optimally in both the image and natural language domains concurrently. Therefore, the learning of the unified OCR model in both the image domain and natural language domain using one synchronized training dataset to train one neural network, thus eliminating the need to establish two separate un-synchronized training datasets in two separate steps. This unified approach may further improve the accuracy when performing OCR tasks.

Figure 3:
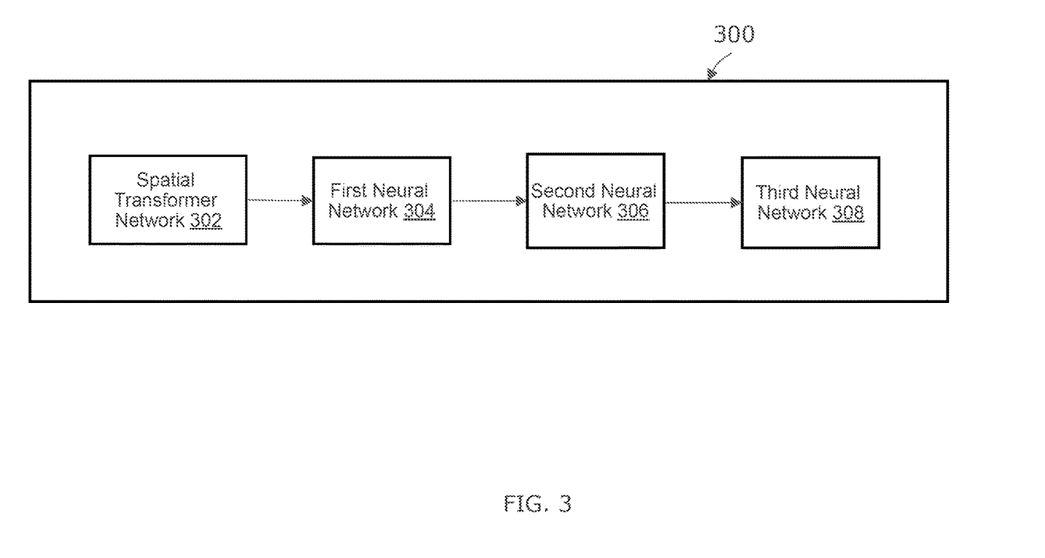
FIG. 3 illustrates a unified OCR model according to an implementation of the disclosure.

In one implementation, the unified OCR model may include a pipeline of four interconnected subnetworks including at least one for processing the image elements of the training sample and at least one for processing the natural language elements of the training sample. FIG. 3 illustrates a unified OCR model 300 according to an implementation of the disclosure. A processing device may be configured to train and deploy the unified OCR model 300.

Referring to FIG. 3, unified OCR model 300 may include a pipeline of four subnetworks. In one implementation, the pipeline may include a spatial transformer network 302, a first neural network 304, a second neural network 306, and a third neural network 308, where at least one of the neural networks 304-308 is designed for processing image features and at least one of the neural networks 304-308 is designed for processing natural language features. In overall, the unified OCR model 300 may include millions of parameters that need to be learned during a training process.

In the training process, spatial transformer network 302 may receive the training data samples from a training dataset. Spatial transformer network 302 is a deep convolutional neural network that includes one or more spatial transformer modules that may transform the input image data into a geometric invariant space domain so that the subsequent neural networks may perform the OCR recognition with less influence from the spatial variances. The spatial variances may include the scale and rotation variances between two similar images. A spatial transformer module may transform an input image (or an input feature map) into a rectified output image (or an output feature map). In some implementations, a spatial transformer module may include a localization network and a grid generator.

The localization network may transform the input feature map U (e.g., an array of pixel values) into a set of parameters with a dimension determined by the transformation. For example, if the transformation is a projective transform having 8 degrees of freedom, the dimension of the parameters would be also 8. The localization network may be implemented using a convolutional neural network (or other types of neural network) containing a regression output layer that outputs the parameters. The grid generator may employ the set of parameters generated by the localization network to produce a sampling grid which includes a set of grid points in a two dimensional space. Each of these grid point defines the location of a sampling kernel to be applied to the input feature map. The application of the sampling kernel to the input feature map produce the output feature map. In one implementation, a sampler may combine the input feature map and the sampling grid to produce the output feature map by performing a form of interpolation operation. This may be useful if the sampling grid does not match the coordinates of the input feature map, and the interpolation can calculate the output feature map on a same coordinate system as that the input feature map.

The input feature map received by an input layer of the spatial transformer network 302 can be the image crop in a training data sample specified with an image height and an image width, and the output feature map generated by the spatial transformer network 302 can be a rectified image with a rectified image height and a rectified image width. The rectified image along with the corresponding text object in the training data sample may be fed into the first neural network 304 and processed in a pipeline fashion through first, second, and third neural networks 304-308. The first, second, and third neural networks 304-308 may include at least one neural network for detecting the text content in the rectified image crop, and at least one neural network for processing the detected text content according to a natural language model. For example, neural networks 304, 306 can be deep residual networks (ResNet) that can be trained for recognizing characters in a document image, and neural network 308 can be a general AutoML platform that may be trained to correct the recognition errors in the detected text content based on a natural language model.

In the forward propagation of the training process, unified OCR model 300 may receive a training data sample that includes a data pair of an image crop and the text object therein. Spatial transformer network 302 may obtain the image crop in the training data sample as the input feature map and produce an output feature map in a geometric invariant space. The output feature map is a rectified image crop. The rectified image crop may be fed into neural networks 304, 306 for character detection to detect the text content in the image crop. The detected text content may be fed into neural network 308 to correct linguistic errors in the detected text content according to a natural language model. The output of neural network 308 is the recognized text content in the image crop. The recognized text content may be compared with the text object in the training data sample to obtain a training error. In a backward propagation, the parameters of neural networks 302-308 may be adjusted in a way to reduce the training error. The forward propagation and backward propagation may be iteratively performed over a large quantity of training data samples during the training process until the training error is converged to a value within a tolerance margin. When the error is converged, unified OCR model 300 is trained to perform OCR tasks.

Figure 4:
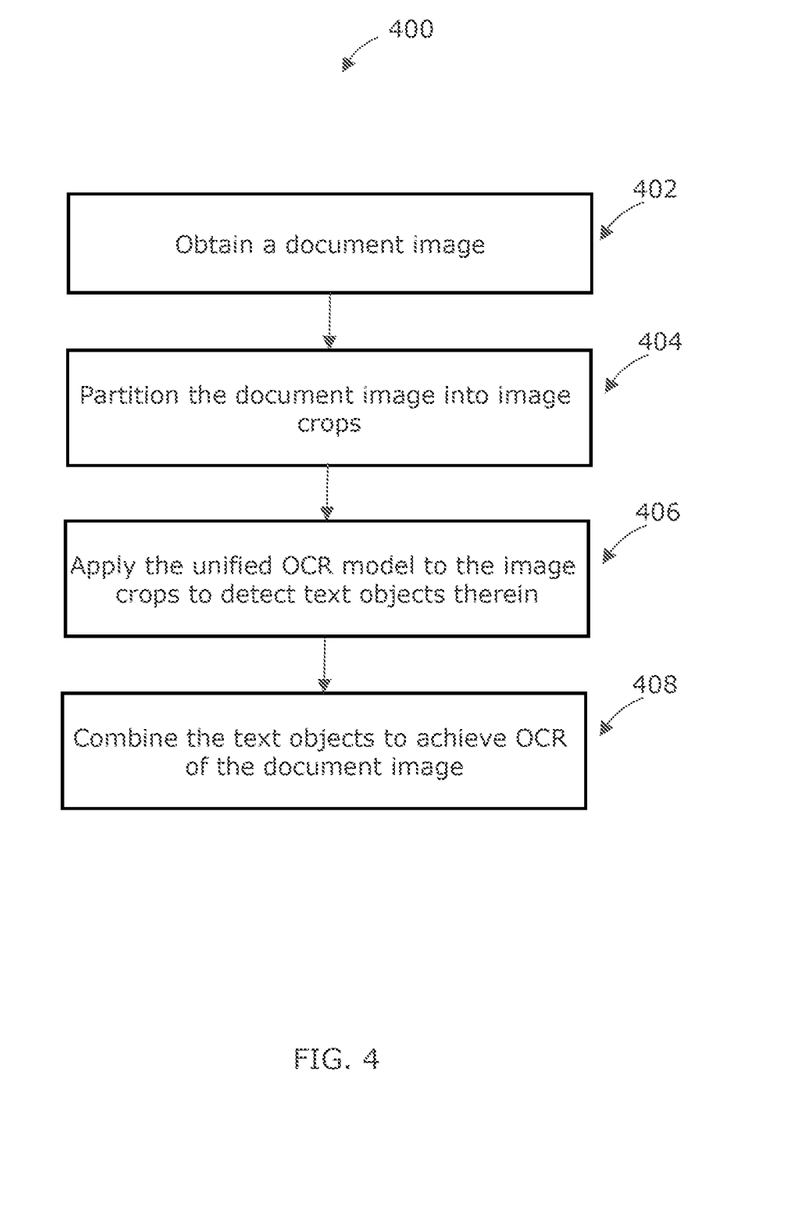
FIG. 4 illustrates a flowchart of a method for performing OCR operations on a document image using a trained unified OCR model according to an implementation of the disclosure.

FIG. 4 illustrates a flowchart of a method 400 for performing OCR operations on a document image using a trained unified OCR model according to an implementation of the disclosure. This method may be performed by a processing device. Referring to FIG. 4, the processing device may, at 402, obtain a document image. The document image may contain an array of pixels representing a text content of one or more natural languages.

At 404, the processing device may partition the document image into image crops. The partitioning may include detecting potential regions of text content (e.g., using computer vision techniques) and cropping these regions into image crops.

At 406, the processing device may apply the unified OCR model (which has already been trained as described above) to the image crops to detect text objects therein.

At 408, the processing device may combine the detected text objects together to achieve OCR of the document image.

Figure 5:
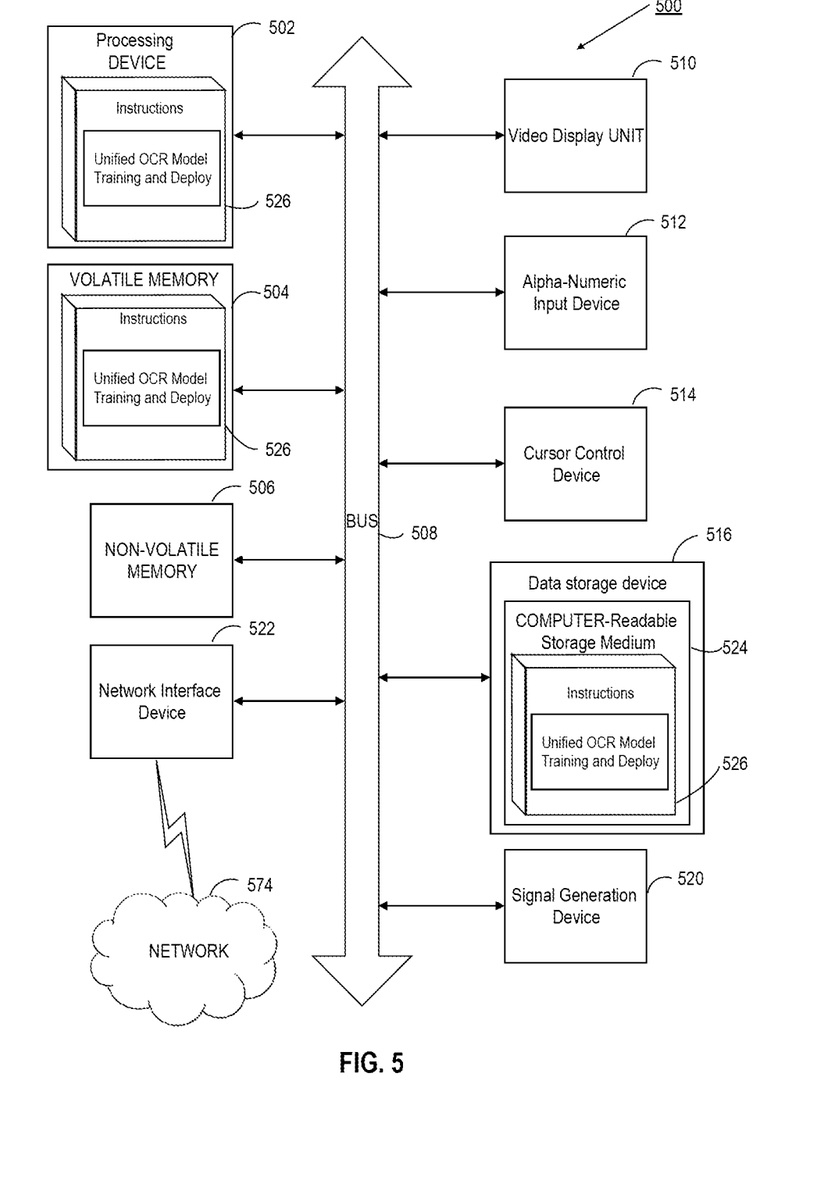
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 500 may correspond to the processing device 2 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

Data storage device 516 may include a non-transitory computer-readable storage medium 524 on which may store instructions 526 encoding any one or more of the methods or functions described herein, including instructions of the neural network training application 102 of FIG. 1.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "determining," "updating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A system implemented by one or more computers for constructing a training dataset, the one or more computers comprising:

a storage device; and
A hardware processor, communicatively connected to the storage device, to:
obtain a searchable portable document format (PDF) document;
identify a bounding box defining a region in a background image that is associated with an overlaying text object defined in the PDF document;
determine an image crop of the PDF document according to the bounding box; and
generate a training data sample for the training dataset, the training data sample comprising a data pair of the image crop and the associated text object,
wherein the hardware processor is further to train a neural network model using the training dataset, wherein the neural network model comprises at least one subnetwork for recognizing text content in the image crop and at least one subnetwork for correcting errors in the recognized text content according to a natural language model, and wherein the neural network model is a unified OCR neural network model comprising a pipeline of subnetworks, and the pipeline of subnetworks comprise a spatial transformer network for receiving the training data sample from the training dataset, a first neural network for recognizing text content in the image crop of the training data sample, and a second neural network for correcting errors in the recognized text content according to a natural language model.

2. The system of claim 1, wherein the hardware processor is further to augment the image crop of the training data sample to generate an augmented training data sample.

3. The system of claim 2, wherein to augment the image crop of the training data sample, the hardware processor is further to at least one of:
- add a random value to at least one pixel in the image crop, or
- perform at least one of customization of color schema, random rotation, random blurry, random torsion, random transparency generation to the background image.

4. The system of claim 1, wherein the image crop comprises an array of pixel values corresponding to the bounding box having a height and a length, and wherein the array of pixel values contains a rendered representation of the overlaying text object.

5. The system of claim 1, wherein the text object comprises at least one of a character, a word, a sentence, a paragraph, or an article of a natural language.

6. The system of claim 1, wherein to train the neural network model using the training dataset, the hardware processor is to:
- determine a training error by comparing the text object of the training data sample with a result generated by the second neural network; and
- adjust at least one parameter of the spatial transformer network, the first neural network, or the second neural network.

7. The system of claim 1, wherein responsive to training the neural network, the hardware processor is to provide the trained neural network to perform OCR tasks on document images.

8. A method for constructing a training dataset, the method comprising:
- obtaining, by a processing device, a searchable portable document format (PDF) document;
- identifying a bounding box defining a region in a background image that is associated with an overlaying text object defined in the PDF document;
- determining an image crop of the PDF document according to the bounding box;
- generating a training data sample for the training dataset, the training data sample comprising a data pair of the image crop and the associated text object;
- training a neural network model using the training dataset, wherein the neural network model comprises at least one subnetwork for recognizing text content in the image crop and at least one subnetwork for correcting errors in the recognized text content according to a natural language model, wherein the neural network model is a unified OCR neural network model comprising a pipeline of subnetworks, and wherein the pipeline of subnetworks comprise a spatial transformer network for receiving the training data sample from the training dataset, a first neural network for recognizing text content in the image crop of the training data sample, and a second neural network for correcting errors in the recognized text content according to a natural language model.

9. The method of claim 8, further comprising augmenting the image crop of the training data sample to generate an augmented training data sample.

10. The method of claim 9, wherein augmenting the image crop of the training data sample to generate an augmented training data sample further comprises:
- adding a random value to at least one pixel in the image crop, or
- performing at least one of customization of color schema, random rotation, random blurry, random torsion, random transparency generation to the background image.

11. The method of claim 8, wherein the image crop comprises an array of pixel values corresponding to the bounding box having a height and a length, wherein the array of pixel values contains a rendered representation of the overlaying text object, and wherein the text object comprises at least one of a character, a word, a sentence, a paragraph, or an article of a natural language.

12. The method of claim 8, wherein training a neural network model using the training dataset comprises:
- determining a training error by comparing the text object of the training data sample with a result generated by the second neural network; and
- adjusting at least one parameter of the spatial transformer network, the first neural network, or the second neural network.

13. The method of claim 12, further comprising:
- responsive to training the neural network, providing the trained neural network to perform OCR tasks on document images.

14. A machine-readable non-transitory storage media encoded with instructions that, when executed by one or more computers, cause the one or more computer to construct a training dataset, to:
- obtain a searchable portable document format (PDF) document;
- identify a bounding box defining a region in a background image that is associated with an overlaying text object defined in the PDF document;
- determine an image crop of the PDF document according to the bounding box; and
- generate a training data sample for the training dataset, the training data sample comprising a data pair of the image crop and the associated text object,
- wherein the hardware processor is further to train a neural network model using the training dataset, wherein the neural network model comprises at least one subnetwork for recognizing text content in the image crop and at least one subnetwork for correcting errors in the recognized text content according to a natural language model, and wherein the neural network model is a unified OCR neural network model comprising a pipeline of subnetworks, and the pipeline of subnetworks comprise a spatial transformer network for receiving the training data sample from the training dataset, a first neural network for recognizing text content in the image crop of the training data sample, and a second neural network for correcting errors in the recognized text content according to a natural language model.

\* \* \* \* \*